United States Patent
Barnes et al.

(10) Patent No.: US 6,711,147 B1
(45) Date of Patent: Mar. 23, 2004

(54) MERGED PACKET SERVICE AND MOBILE INTERNET PROTOCOL

(75) Inventors: Mary H. Barnes, Flower Mound, TX (US); Akram Hosain, Dallas, TX (US); Emad A. Qaddoura, Plano, TX (US); Haseeb Akhtar, Garland, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/333,841

(22) Filed: Jun. 15, 1999

Related U.S. Application Data
(60) Provisional application No. 60/127,406, filed on Apr. 1, 1999.

(51) Int. Cl.[7] .............................................. H04L 12/66
(52) U.S. Cl. ...................................... 370/338; 370/401
(58) Field of Search ................................. 370/328, 329, 370/338, 352, 353, 401, 465, 466, 354–356, 331, 332, 395.5, 395.51, 395.52, 408, 409; 709/200, 201, 202, 213, 245, 246, 249

(56) References Cited

U.S. PATENT DOCUMENTS

| | | | | |
|---|---|---|---|---|
| 5,623,601 A | * | 4/1997 | Vu ............................... | 713/201 |
| 5,987,013 A | * | 11/1999 | Kabasawa ................... | 370/331 |
| 6,104,929 A | * | 8/2000 | Josse et al. ................. | 455/445 |
| 6,119,012 A | * | 9/2000 | Amirijoo ..................... | 455/432 |
| 6,138,019 A | * | 10/2000 | Trompower et al. ........ | 455/436 |
| 6,167,513 A | * | 12/2000 | Inoue et al. ................. | 380/255 |
| 6,178,181 B1 | * | 1/2001 | Glitho ......................... | 370/467 |
| 6,201,962 B1 | * | 3/2001 | Sturniolo et al. ........... | 370/338 |
| 6,212,635 B1 | * | 4/2001 | Reardon ...................... | 380/30 |
| 6,230,005 B1 | * | 5/2001 | Le et al. ................... | 455/414.1 |
| 6,230,012 B1 | * | 5/2001 | Willkie et al. .............. | 455/435 |
| 6,233,234 B1 | * | 5/2001 | Curry et al. ................. | 370/356 |
| 6,243,579 B1 | * | 6/2001 | Kari ............................ | 370/320 |
| 6,243,581 B1 | * | 6/2001 | Jawanda ...................... | 455/432 |
| 6,272,450 B1 | * | 8/2001 | Hill et al. .................... | 370/241 |
| 6,317,421 B1 | * | 11/2001 | Wilhelmsson et al. ...... | 370/328 |
| 6,324,183 B1 | * | 11/2001 | Miller et al. ................ | 370/467 |
| 6,353,607 B1 | * | 3/2002 | Valentine et al. ........... | 370/349 |
| 6,370,390 B1 | * | 4/2002 | Salin et al. .................. | 455/426 |
| 6,404,754 B1 | * | 6/2002 | Lim ............................. | 370/338 |
| 6,438,115 B1 | * | 8/2002 | Mazur et al. ............. | 156/89.11 |
| 6,490,273 B1 | * | 12/2002 | DeNap et al. ............... | 370/352 |
| 6,496,505 B2 | * | 12/2002 | La Porta et al. ............ | 370/392 |

* cited by examiner

*Primary Examiner*—Jean Alland Gelin
(74) *Attorney, Agent, or Firm*—Haynes & Boone, LLP

(57) ABSTRACT

A network, system and method for merging a packet service such as GPRS with a mobile IP is disclosed. The GPRS network includes a first base station for providing wireless access to a mobile node, a GPRS support node (GSN) connected to the base station, and a security gateway for connecting the GPRS network to a second network that may use mobile IP. The GSN is capable of creating an IP tunnel connecting it to the second network through the security gateway. The GSN is also capable of handling mobile IP specific messaging and converting the wireless access to mobile IP specific messaging.

21 Claims, 5 Drawing Sheets

MERGED PACKET SERVICE AND MOBILE INTERNET PROTOCOL

CROSS REFERENCE

This invention relies on a provisional patent application U.S. Ser. No. 60/127,406 filed on Apr. 1, 1999.

TECHNICAL FIELD

This invention relates generally to management techniques for a wireless communications network and, more particularly, to a system and method for providing wireless communications by merging packet service and mobile internet protocol.

BACKGROUND

There are many emerging trends in the communications world, including the increase in mobile network technology and the rise in packet data networks. There are many types of mobile network technology, including global systems mobile ("GSM"), code division multiple access ("CDMA"), time division multiple access ("TDMA"), and advanced mobile phone service ("AMPS"). Likewise, there are many types of packet data technology, such as asynchronous transfer mechanism ("ATM") and internet protocol ("IP"). A packet, or datagram, is a transmission method in which sections of a message are transmitted in scattered order and then re-ordered at a receiving node.

It is often desired to establish or maintain a connection that utilizes mobile network technology and packet data technology. For example, a global packet radio services ("GPRS") technology is being developed to implement packet data technology for GSM networks. Separately, certain IP networks are being developed to support mobile, or wireless, communications (hereinafter referred to as "mobile IP"). Although the move to mobile IP technology is desirable, it has not merged well with conventional mobile technology.

GPRS

GPRS is an emerging GSM phase 2+ packet radio standard, similar to cellular digital packet data. It provides more efficient usage of the GSM radio interface because mobile units, or mobile nodes, can share a common radio channel. GPRS also provides direct interworking to the transmission control protocol IP (e.g., the Internet), X.25 standard networks, and connectionless-mode network service networks for point-to-point services and point-to-multipoint services (e.g., broadcast and group calls). GPRS supports concurrent operation with existing GSM services for circuit-switched speech, circuit-switched data and the service management system ("SMS" or "the intelligent network") and is considered a long term replacement for signaling system 7 based SMS.

Consider for example FIG. 1a of the drawings. The reference numeral 10 refers, in general, to a simplified conventional GSM network that supports the GPRS standard, hereinafter referred to as a "GPRS network." The GPRS network 10 allows a node such as a mobile node 12 to communicate with a packet network 14, such as the Internet, to further connect with a host 15. The host 15 is a correspondent node which may be either mobile or stationary. The GPRS network 10 also allows the mobile node 12 to communicate with a circuit switched network such as the public switched telephone network ("PSTN," not shown). The mobile node 12 contains the necessary components to establish a wireless connection to a second/third generation (2G/3G) radio access network, represented by a base station 16. The base station 16 provides a voice link, a data link, and a control link to various nodes of the network 10.

For conventional wireless telephone calls, the base station 16 creates a voice and control link to a mobile switching center ("MSC") 18, which provides a voice link to a telephone network such as the PSTN. The MSC 18 includes a visitor location register ("VLR") 18a and is connected via a control link to other nodes such as a home location register ("HLR") 20 and a SMS 22. The HLR 20 is enhanced to include GPRS subscription data for use in the GPRS elements discussed below. The SMS 22 may be a gateway MSC, for example, and may further link to other nodes, as well known in the art. The SMS 22, HLR 20, and MSC 18 are all interconnected via a mobile application protocol ("MAP") interface.

For packet data calls, the network 10 includes several GPRS network elements, including GPRS support nodes ("GSNs"). A serving GSN ("SGSN") 30 is connected to the base station 16 via a signaling and data transfer interface 32. The SGSN 30 is also connected to the MSC/VLR 18, 18a via a signaling interface 34, to the SMS 22 via a signaling and data transfer interface 36, and to the HLR 20 via a signaling interface 38. The SGSN 30 is further connected to a gateway GSN ("GGSN") 40 via a signaling and data transfer interface 42 and to a GGSN 44 via a signaling and data transfer interface 46. The GGSN 40 is further connected to the packet network 14 via a signaling and data transfer interface 48 and the GGSN 44 is connected to a public land mobile network ("PLMN," not shown).

Referring also to FIG. 1b, the SGSN 30 includes various modules to perform mobility management and authentication procedures. It also routes packet data as required. Like the VLR 18a, the SGSN 30 stores only a subset of subscriber data normally available at the HLR 20. For the sake of example, the SGSN 30 includes an originating call handler (or "OCH") 50 and a terminating call handler (or "TCH") 52. The OCH 50 handles exchanges with an originating agency while the TCH 52 handles exchanges with the terminating agency. Both the OCH 50 and the TCH 52 are configured to handle messages formatted in accordance with a predetermined industry standard GPRS protocol. It is understood that the OCH 50 and the TCH 52 are representative of various modules that perform messaging and other protocol functions.

The GGSNs 40, 44 provide functionality similar to a conventional gateway MSC, except that the GGSNs support packet data. The GGSNs 40, 44 use a packet data protocol which contains IP routing information. The routing information is used to "tunnel" data from the mobile node 12 to the current point of attachment. A tunnel is a path followed by a packet while it is encapsulated. While encapsulated, a packet is routed to a node where it is decapsulated and forwarded to its ultimate destination.

The GPRS elements 30, 40, and 44 are arranged according to "routing areas," which are subsets of a GSM "location area." When a mobile node enters a routing area, it performs one or more registrations. There are three types of routing area registrations: 1) Routing Area Updating is when a mobile node enters a new routing area; 2) GPRS Attach/Detach indicates mobile node activation and prevents paging a mobile node when it is not active; and 3) Periodic Routing Area Update ensures that regular radio contact is maintained by the mobile node. Upon registration, the SGSN serving the new routing area updates the "context" of the mobile node. The context includes a GPRS Packet Data Protocol ("PDP"), which is part of the mobile node's address. The PDP context is updated so that the GGSN in the old routing area will send packets to the new SGSN. Other parts of the context may include various identifiers, an access point name, and so forth.

Mobile IP

Mobile IP is an emerging "layer 3" type protocol that allows a mobile node to establish a wireless connection to an IP network. mobile IP essentially has three major subsystems. First, a discovery mechanism provides mobile nodes with new attachment points (new IP addresses) as they move within the IP network. Second, when the mobile node learns its new IP address, it registers it with its "home network." A home network is a network, possibly virtual, that has a network prefix matching that of the mobile node's "home address." A home address is an IP address that is assigned for an extended period of time to a mobile node. It remains unchanged regardless of where the mobile node is attached. Standard IP routing mechanisms will deliver packets destined to a mobile node's home address to the mobile node's home network.

A third subsystem is that mobile IP allows data to be directed to the mobile node when it is away from its home network by using the registered IP address. For the sake of reference, mobile IP is discussed in greater detail in the book Charles E. Perkins, MOBILE IP: DESIGN PRINCIPLES AND PRACTICES (Computer & Engineering Publishing Group ISBN: 0-201-63469-4, 1998).

Consider for example FIG. 2 of the drawings. The reference numeral 100 refers, in general, to a simplified conventional mobile IP network. The network 100 allows the mobile node 12 to communicate with a packet network 104, such as a wireless local area network, to further connect with a host 105 or to the internet. The mobile node 12 includes the necessary components (not shown) to establish a wireless connection to a home agent 106a. A home agent is a router on the mobile node's home network that maintains current location information for the mobile node and delivers packets to the mobile node when it is in away. Although the same mobile node 12 is described in FIGS. 1 and 2, it is understood that different equipment may actually be required for the different networks.

When away from its home network, the home agent provides a "care-of address" for the mobile node 12. A care-of address is a termination point of a tunnel toward a mobile node, for packets forwarded to the mobile node while it is away from home. There are two different types of care-of address: a foreign agent care-of-address is an address of a foreign agent with which the mobile node is registered, and a collocated care-of address is an externally obtained local address which the mobile node has associated with one of its own network interfaces. When the mobile node is away from home, it registers its care-of address with its home agent. The home agent 106a provides a data link and a control link to various nodes of the network 100. The mobile node uses its home address as the source address of all IP packets that it sends, except where otherwise required.

The mobile node 12 may roam about the mobile IP network 100 by establishing wireless (or wireline) connections with various foreign agents 106b, 106c. A foreign agent is a router in a "visited" foreign network which cooperates with the home agent to complete the delivery of packets to the mobile node while it is away from home. A visited foreign network is a network other than a mobile node's home network, to which the mobile node is currently connected. The foreign agent maintains a visitor list of all the visiting mobile nodes. For the sake of example, the mobile node may roam to a location "A" and establish a wireless connection with foreign agent 106b in a first visited network, and then may roam to a location "B" and establish a wired connection with foreign agent 106c in a second visited network.

When the mobile node 12 is roaming (for instance, at position A), packets sent to the mobile node's home address are intercepted by the home agent 106a, tunneled to the care-of address, received at the tunnel endpoint (foreign agent 10b), and finally delivered to the mobile node. In the reverse direction, packets sent by the mobile node 12 are generally delivered to their destination using standard IP routing mechanisms, not necessarily passing through the home agent 106a.

Mobile IP has a process called "IP Security." IP security is a tunneling security context between a pair of nodes. For example, IP Security may use a Security Parameters Index for identifying a security context between a pair of nodes among the contexts available in the mobility security association.

It is desired to merge wireless network packet service, such as is described in FIG. 1, with mobile IP service, such as is described in FIG. 2.

It is further desired that this merger be relatively simple to implement.

It is also desired that a mobile node may seamlessly roam between a wireless network and a mobile IP network.

SUMMARY

In response to the problems and needs described above, provided is a network, system and method for merging a packet service such as GPRS with a mobile internet protocol. For example, a GPRS network may include a first base station for providing wireless access to a mobile node, a GPRS support node (GSN) connected to the base station, and a security gateway for connecting the GPRS network to a second network that may use the mobile internet protocol. In one embodiment, the GSN is capable of creating an internet protocol tunnel connecting it to the second network through the security gateway. The GSN is capable of handling mobile internet protocol specific messaging and also converts the wireless access to mobile internet protocol specific messaging.

In some embodiments, the GPRS network also includes a second base station for optionally providing wireless access to the mobile node. Therefore, the GSN handles the mobility of the mobile node from the first base station to the second base station as well as the interface to the second network.

In some embodiments, the GPRS network also includes a register, such as a home location register, connected without mobile internet protocol specific messaging. The GSN can further communicate with the register and can serve as a proxy to the register for the second network.

In some embodiments, the GPRS network allows the mobile node to roam to a routing area served by the GSN. In this embodiment, the GPRS network sends a mobile internet protocol message to an old node, such as a foreign agent, in the mobile internet protocol network. The mobile internet protocol message includes an indicator that a context for the mobile node is desired.

In some embodiments, the method of the present disclosure allows the mobile node to transition from a first routing area to a second routing area in various combinations of networks. The method detects that the mobile node is in the second routing area and sends a mobile internet protocol message from a node in the second routing area to a node in the first routing area. The mobile internet protocol message indicates to the node of the first routing area that any packets received thereafter are to be routed to the second routing area. The mobile internet protocol message may include an indicator to the first routing area that the context for the mobile node is requested. The context can then be received from the first routing area into the second routing area if the second routing area is responsive to the indicator.

In some embodiments, the network of the present disclosure includes the GSN in a first routing area capable of providing a wireless connection to the mobile node roaming from a second routing area. The GSN includes a protocol structure for detecting that the mobile node is in the first routing area and sending a mobile internet protocol message to a node in the second routing area. The message indicates to the node of the second routing area that any packets received thereafter are to be routed to the first routing area. The protocol structure also provides an indicator to the second routing area that the context for the mobile node is requested.

In some embodiments, the method can be used for updating the home location register in the GPRS network of activities by the mobile node in the second network. The method receives a first mobile internet protocol registration request by an agent of the second network serving the mobile node, sends a second mobile internet protocol registration request to the GSN, requesting that the GSN serve as a proxy, and sends a location message to the register from the GSN.

In some embodiments, the method also sends a first registration reply to the GSN after the location message has been received by the register. The method then sends a second registration reply to the agent after the first registration reply has been received by the GSN.

In some embodiments, the handover method detects that the mobile node is in the second routing area and before handover occurs, sends a message from a node in the second routing area to a node in the first routing area. The message indicates to the node of the first routing area that any packets received thereafter are to be temporarily held. The handover can then be performed and the method can then indicate to the node of the first routing area to forward the held packets to the second routing area. This indication may occur, in some embodiments, after a timeout.

In some embodiments, the method stops data loss when the mobile node performs a handover from an old serving area to a new serving area. In these embodiments, the method provides a new message to an access interface between the two areas. When the mobile node is about to enter the new serving area, the method sends a GPRS handover request message to a node of the old serving area. The handover request message indicates that the node of the old serving area is to hold any packets destined for the mobile node until the node is notified that the mobile node is in the new serving area.

An advantage achieved by the present disclosure is that wireless network packet service, such as is described in FIG. 1, is merged with mobile IP service, such as is described in FIG. 2.

Another advantage achieved by the present disclosure is that the merger be relatively simple to implement.

Yet another advantage achieved by the present disclosure is that a mobile node may seamlessly roam between a wireless network and a mobile IP network.

DETAILED DESCRIPTION

Figure 1A:
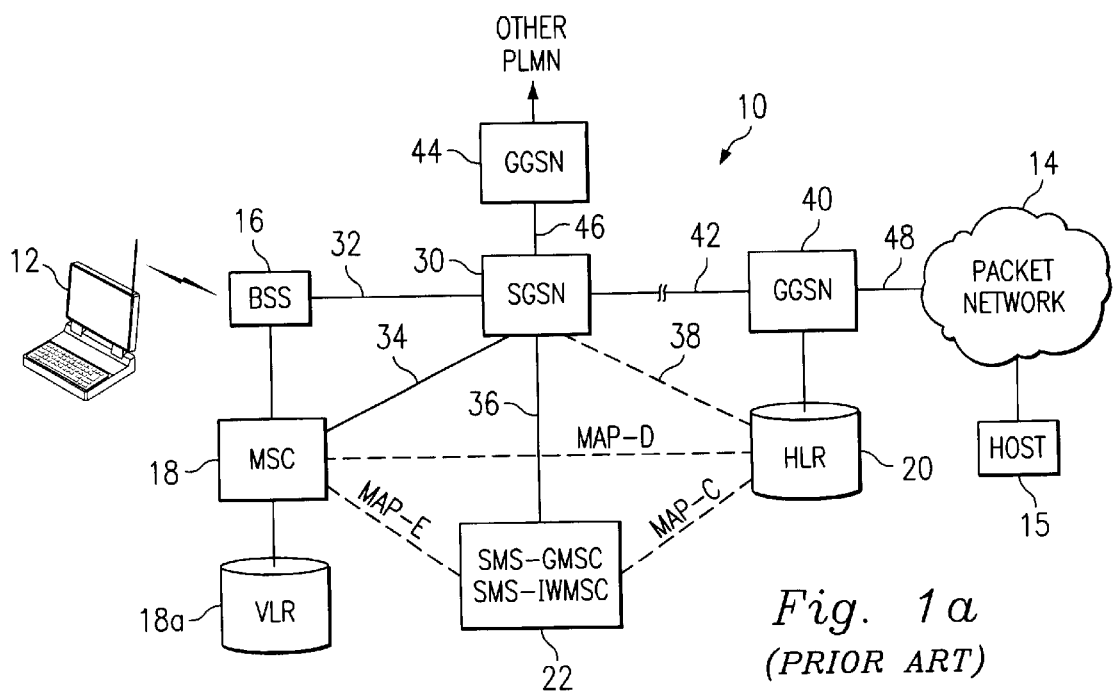
FIG. 1a is a schematic block diagram of a simplified conventional GPRS network.
Figure 1B:
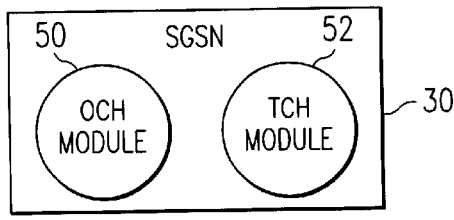
FIG. 1b is a schematic block diagram of a simplified serving GPRS service node.
Figure 2:
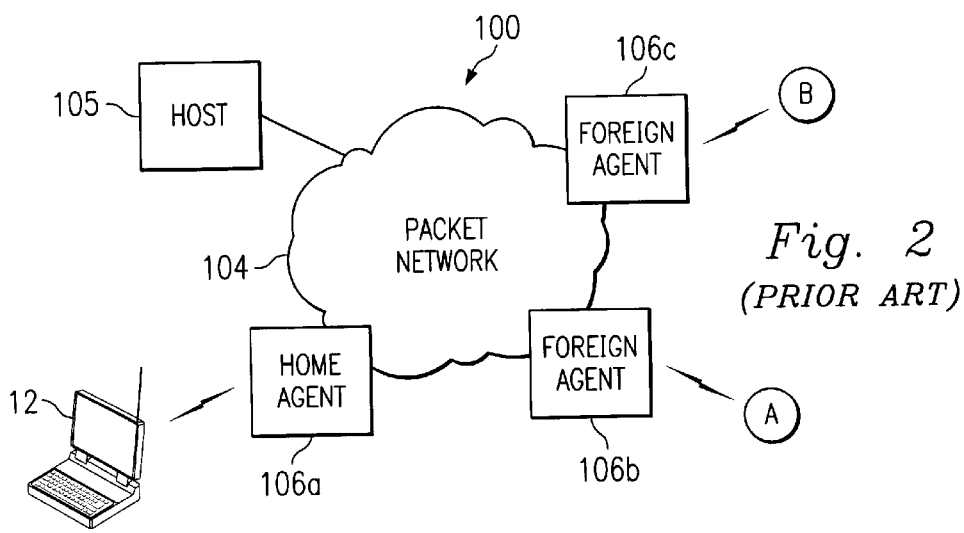
FIG. 2 is a schematic block diagram of a simplified conventional mobile IP network.

As stated above, FIGS. 1a, 1b, and 2 illustrate a conventional GPRS network and mobile IP network, respectively.

The following disclosure provides many different embodiments, or examples, for implementing different features. Techniques and requirements that are only specific to certain embodiments should not be imported into other embodiments. Also, specific examples of networks, components, and messages are described below to simplify the present disclosure. These are, of course, merely examples and are not intended to limit the invention from that described in the claims.

Figure 3:
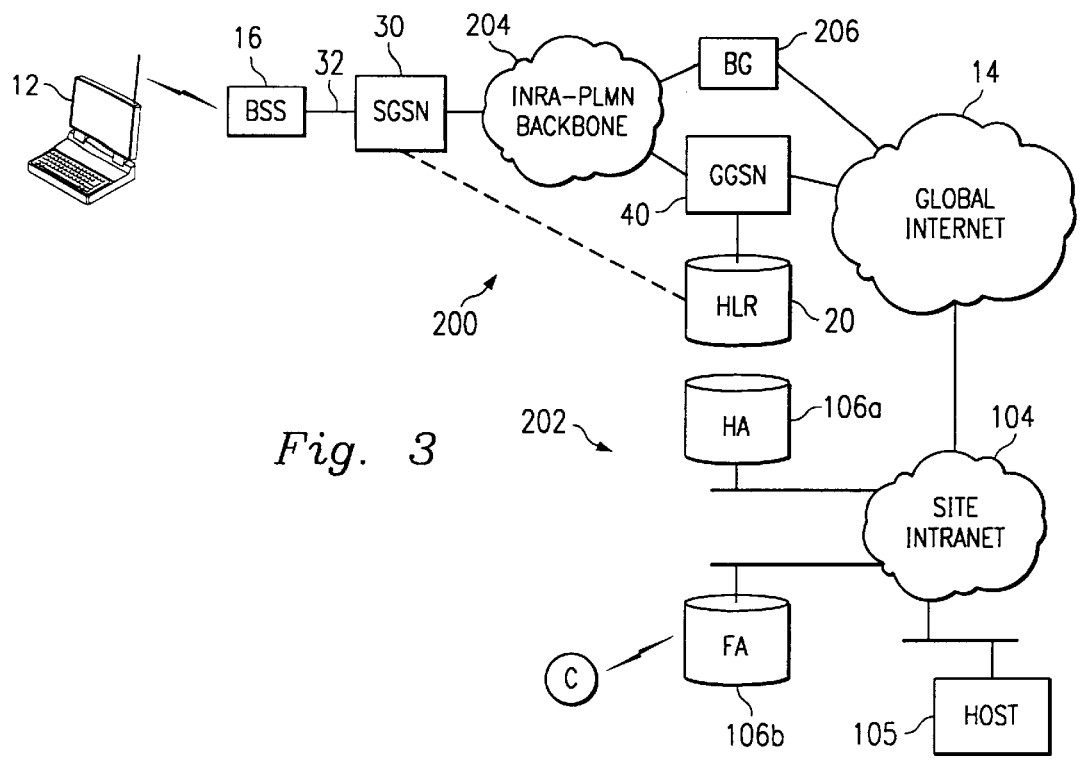
FIG. 3 is a schematic block diagram of a first embodiment of several combined networks, including a GPRS network and a mobile IP network.

Referring now to FIG. 3, a GPRS network 200 and a mobile IP network 202, both of which are connected to the internet 14, provide an environment for a simplified example of how the two networks 200, 202 may be inter-connected. It is understood, however, that the configuration of FIG. 3 is meant merely for example and leaves out certain details well known by those of ordinary skill in the art. For the sake of consistency, many elements of FIG. 3 are similar to elements of FIGS. 1 and 2, and will therefore be numbered as in these earlier figures.

The GPRS network 200 includes a base station 16 that is connected to the SGSN 30 through the interface 32. The SGSN 30 is further connected to the GGSN 40 through an Intra PLMN backbone 204. The PLMN backbone 204 is the tunneling protocol between the SGSN 30 and the GGSN 40. The tunneling protocol is not a standard IP protocol as discussed above with respect to mobile IP (FIG. 2). The GPRS network 200 also includes a border gateway ("BG") 206. The BG provides a secure "firewall" for the GPRS network to the outside world.

The mobile IP network 202 includes an intranet 104 with a home agent 106a and one or more foreign agents 106b. Also for the sake of example, the host 105 is located on the intranet 104.

It is desired to allow the mobile node 12 to roam between the GPRS network 200 and the mobile IP based network 202. Consider for example, a user is traveling on a bus to work. The user is carrying the mobile node 12 while on the bus and is accessing the host 105 through the GPRS network 200. The user exits the bus and enters her workplace, which is supported by a the mobile IP network 202. The user wishes to seamlessly maintain her contact with the host 105 as she changes networks, such as at a location "C". While the user is on the bus, the GPRS network 200 knows the location of the mobile node 12 at all times by the HLR 20. When the user enters her workplace, the mobile IP network 202 uses the home agent 106*a* to keep track of the mobile node 12.

There are two variations to the above-described example. For one, the GPRS network 200 serves as the home network, with the IP address for the mobile node 12 maintained in the HLR 20. Alternatively, the mobile IP network 202 includes the home network and the IP address is dynamically allocated by the home agent 106*a*. The transition from the GPRS network 200 to the mobile IP network 202 (and vice versa) has problems because the interface to the home agent 106*a* is IP based, while the interface to the HLR 20 is SS7 based. There is no mechanism for handing over the call from the GPRS network 200 to the mobile IP network 202 without changing the setup of the mobile node 12.

An Improved Network

Figure 4:
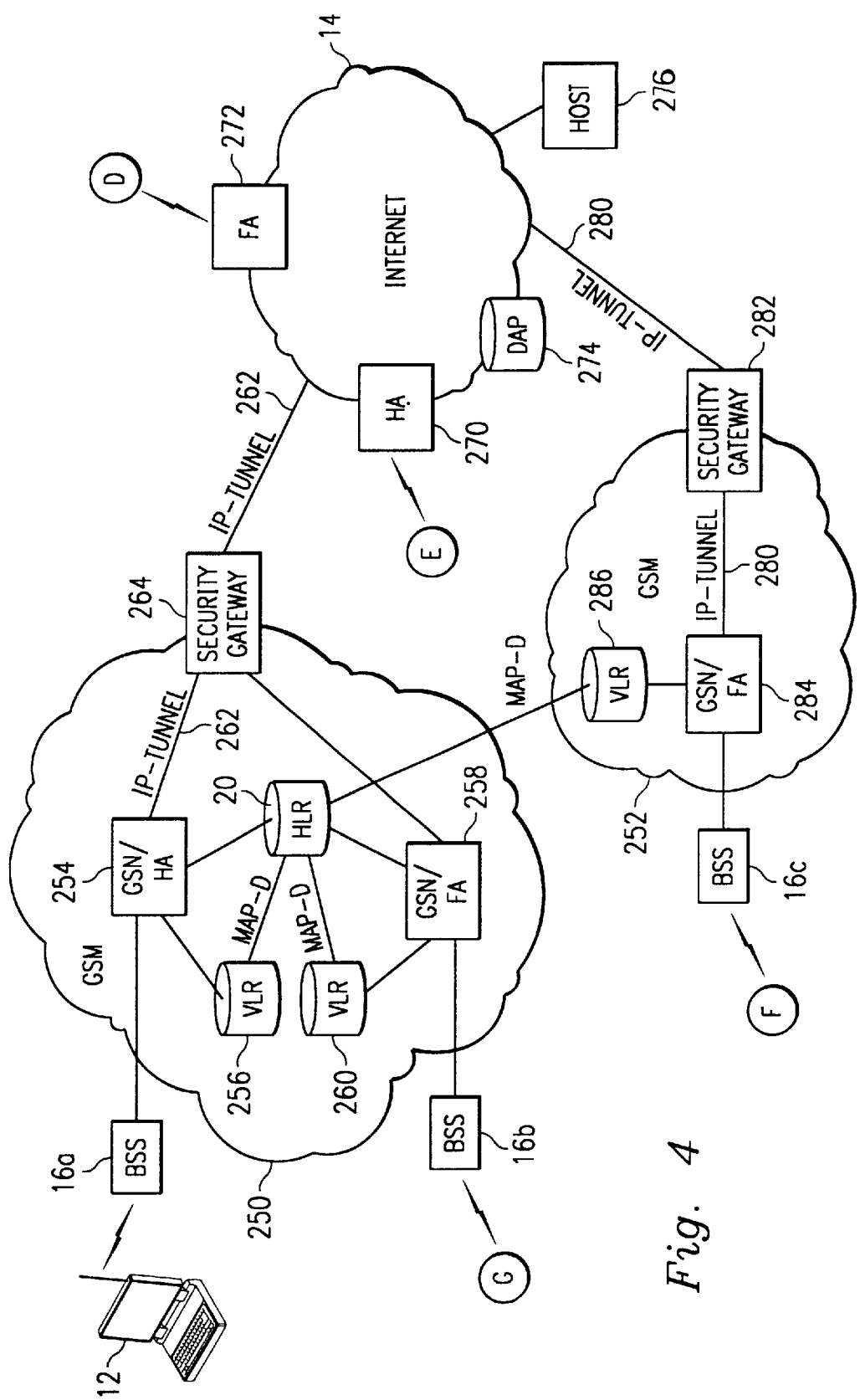
FIG. 4 is a schematic block diagram of a second embodiment of several combined networks, including a GPRS network and a mobile IP network.

Referring now to FIG. 4, a modified telecommunications network is illustrated with two GPRS networks 250, 252 and the mobile IP network 14. It is understood that the arrangement of networks (GSM/GPRS networks, internet, site intranet, and so forth) have been arranged in many different ways in the drawings. This is to show at least some of the many possible arrangements of networks that can benefit from the present inventions.

The GPRS network 250 connects to base station 16*a*, 16*b* which are capable of establishing a wireless link with the mobile node 12. In the present example, the wireless link is a 2G/3G GSM radio access. The base station 16*a* includes an interface to a GSN/HA 254 which may, in some embodiments, use a VLR 256. The VLR 256 may be separated from the GSN/HA 254. For example, the VLR 256 may be the VLR 18*a* associated with the MSC 18 of FIG. 1. The GSN/HA 254 also utilizes a HLR 20, which in the present embodiment is located in the network 250. The HLR 20 is conventionally connected to the VLR 256 through a MAP interface. The base station 16*b* includes an interface to a GSN/FA 258 which may also include a VLR 260, similar to the GSN/HA 254 and the VLR 256.

The GSN/HA 254 and the GSN/FA 258 are GPRS service nodes that incorporate some new functionality that is discussed below. The GSN/HA 254 replaces the SGSN 30 and GGSN 40 of the GPRS network of FIG. 1. The GSN/HA 254 also takes on functionality similar to the home agent 106*a* of FIG. 2. For example, the GSN/HA 254 uses internet protocols instead of conventional telecommunications protocols (such as SS7) for communicating with other switching systems and/or networks. However, the GSN/HA 254 also includes the necessary components associated with conventional telecommunications to interface with the VLR 256 and the HLR 20.

The GSN/FA 258 also replaces the SGSN 30 and GGSN 40 of the GPRS network of FIG. 1. The GSN/FA 258 also takes on functionality similar to the foreign agent 106*b* of FIG. 2. As with the GSN/HA 254, the GSN/FA 258 uses internet protocols instead of conventional telecommunications protocols for communicating with other switching systems and/or networks. The GSN/FA 258 also includes the necessary components associated with conventional telecommunications to interface with the VLR 260 and the HLR 20. It is understood that, coincident with the GPRS network 250, GSM circuit-switched wireless telephone calls are also supported by one or more MSCs (not shown) and/or the GSN/HA 254, as well as the VLR 256, the GSN/FA 258, the VLR 260, and/or the HLR 20.

Both the GSN/HA 254 and the GSN/FA 258 include various modules that perform messaging, translations, IP tunneling and other protocol functions. For example, the GSN/HA 254 supports an IP tunnel 262 to a security gateway 264. The IP tunnel 262 is used for signaling and data transfer between one or more GSNs (such as the GSN/HA 254) and replaces conventional GPRS tunneling protocol ("GTP"). The IP tunnel 262 continues through the security gateway 264 to the mobile IP network 14. The IP tunnel 262 may, in some embodiments, use IP security such as IPSec Tunneling, but in other embodiments may use a tunneling variant.

The mobile IP network 14 includes a home agent 270, a foreign agent 272, a directory authority policy 274 and is connectable to a host 276. The directory authorization policy is a database (like the HLR 20) that in some embodiments is part of the home agent 270. The directory authority policy 274 is an IP internet structure that uses a lightweight directory access protocol.

The mobile IP network 14 is divided into multiple subnets (not shown). The home and foreign agents 270, 272 are shown as part of the "same" internet, but in actuality may be in different subnets. In the present discussion, mobile IP subnets are similar to GPRS routing areas. Also, for border security issues, the foreign agent 272 (and others not shown) may require a hierarchical arrangement.

An IP tunnel 280 connects between the mobile IP network 14 and a security gateway 282 of the GPRS network 252. The IP tunnel 280 further connects to a GSN/FA 284 which utilizes a VLR 286. The VLR 286 also has a MAP interface to the HLR 20 of the GPRS network 250. The VLR 286 may be a component of the GSN/FA 284, or may be separated therefrom. The VLR 286 may also (or alternatively) be associated with an MSC (not shown). The GPRS network 252 further connects to a base station 16*c*, which is capable of establishing a 2G/3G GSM radio access link with the mobile node 12.

The GSN/FA 284 of the GPRS network 252 also replaces a SGSN and GGSN of a conventional GPRS network. The GSN/FA 284 also takes on functionality similar to the foreign agent 106*b* of FIG. 2. For example, the GSN/FA 284 uses internet protocols instead of conventional telecommunications protocols for communicating with other switching systems and/or networks. However, the GSN/FA 284 also includes the necessary components associated with conventional telecommunications to interface with the VLR 286 and the HLR 20. The networks 250, 252 are similarly constructed, with designations of home/visitor and home/foreign being determined by the home network of the mobile node 12.

In a first example of operation, the mobile node 12 establishes a wireless link with the base station 16*a*. The mobile node designates a packet data call, so the base station 16*a* establishes a link with the GSN/HA 254 of the GPRS network 250, its home network. To establish the link, the mobile node provides messaging that includes its Home Address (as used in mobile IP). Because the network 250 has a network prefix matching that of a mobile node's home address, standard IP routing mechanisms will deliver packets destined to a mobile node's home address to the mobile node's home network. Also, the GSN/HA 254 serves as a home agent for the mobile node 12, maintaining its current location information. The GSN/HA 254 also includes conventional GSN functionality so that it updates the HLR 20 with information for the mobile node 12, including IP roaming networks and subnetworks.

The GSN/HA 254 then routes the call to the mobile IP network 14 by with the IP tunnel 262 through the IP based security gateway 264. The IP security gateway 264 utilizes conventional IP security functionality (as a replacement to the border gateway 206 of FIG. 3), such as using a security parameters index. The tunnel 262 connects to the mobile IP network 14, which then completes the call by establishing a link with the host 276.

In continuance of this first example, the mobile node 12 roams to a location "D," where it establishes a conventional wireless link with the foreign agent 272 of the mobile IP network 14. While the mobile node 12 is switching from the GPRS network 250 to the mobile IP network 14, a series of packets are being provided to the mobile node from the host 276.

The mobile node 12 has a home address, similar to those in conventional mobile IP networks. Since the mobile node 12 has moved away from its home network (GPRS network 250), the GSN/HA 254 establishes a care-of address for the mobile node. As the packets are provided to the GSN/HA 254, they are redirected through another tunnel to the foreign agent 272 and finally delivered to the mobile node. In the reverse direction, packets sent by the mobile node 12 are generally delivered to the host 276 using standard IP routing mechanisms, not necessarily passing through the GSN/HA 254.

In a second example of operation, when the mobile node 12 is at a location "E," it is in its home network inside the mobile IP network 14 and can selectively connect with the home agent 270. However, in this example, the mobile node is physically at a location "F" in the visited network 252. The host 276 seeks to establish a call with the mobile node. The host 276 initiates a packet data call, to the mobile node's home address, which directs the call initially to the home agent 270.

The home agent 270 has a care-of address for the mobile node 12 which indicates the GPRS network 252. The call is then redirected through the IP tunnel 280 to the GSN/FA 284. In the present example, the GSN/FA 284 has a care-of address for the mobile node while it is in location F. The call is then directed to the base station 16c which appropriately pages and connects with the mobile node at location F.

Smooth Inter-Network Handover

It is also desired to provide an improved handover method for providing a smooth transition when the mobile node moves to a new routing area (e.g., another network). The transition should have a minimal loss of user data. In prior systems, when the mobile node moves to a new routing area, it does not inform the old routing area that it is gone. Instead, it simply registers with the new routing area.

Specifically, in conventional GPRS networks, once the mobile node registers with a new serving GSN, for example, the new serving GSN requests the old serving GSN to forward its present contents and any future contents to the new one using a SGSN Context Request message. The new serving GSN also updates the context for the mobile node with a SGSN Context Response message.

In conventional mobile IP, the mobile node registers with the foreign agent to obtain a care-of address. This new care-of address is registered with the home agent so that the data for the mobile node is now tunneled to the new foreign agent. Also, Binding Update Request/Acknowledge messages can be sent to/from the prior foreign agent for it to forward any subsequent packets to the new foreign agent for a specific period of time. However, mobile IP networks do not support "contexts," and therefore suffer certain inefficiencies related thereto (e.g., it can not make sure that the new connection has the same quality of service).

In contrast, some embodiments of the present invention replace the GPRS SGSN Context Request message with a modified version of mobile IP's Binding Update Request message for routing area updates. Also, the GPRS SGSN Context Response message is replaced with a modified version of mobile IP's Binding Acknowledgment message. The modified Binding Update Request message includes an option (which may in some embodiments be a single bit) to indicate the requested context. The modified Binding Acknowledgment message will then be extended to include the context, which is easy to implement since the message can be of variable length.

The modified Binding Update Request message is sent from the new GSN/FA to the old GSN/FA to obtain the specifics of the data transfer context and to indicate to the old GSN/FA that any packets received thereafter are to be routed to the new GSN/FA. As a result, the amount of data lost when a mobile node transitions to a new serving area is greatly reduced. Also, the method works the same whether the old node was a GPRS access node or a mobile IP specific foreign agent.

Referring again to FIG. 4, two examples of operation will illustrate the above described method. In the first example, the mobile node 12 will roam from the location D to the location F in the GPRS network 252. In the second example, the mobile node 12 will roam from the GPRS network 250 to the location D in the mobile IP network 14. In both examples, the mobile IP network 14 is the home network for the mobile node 12.

Figure 5A:
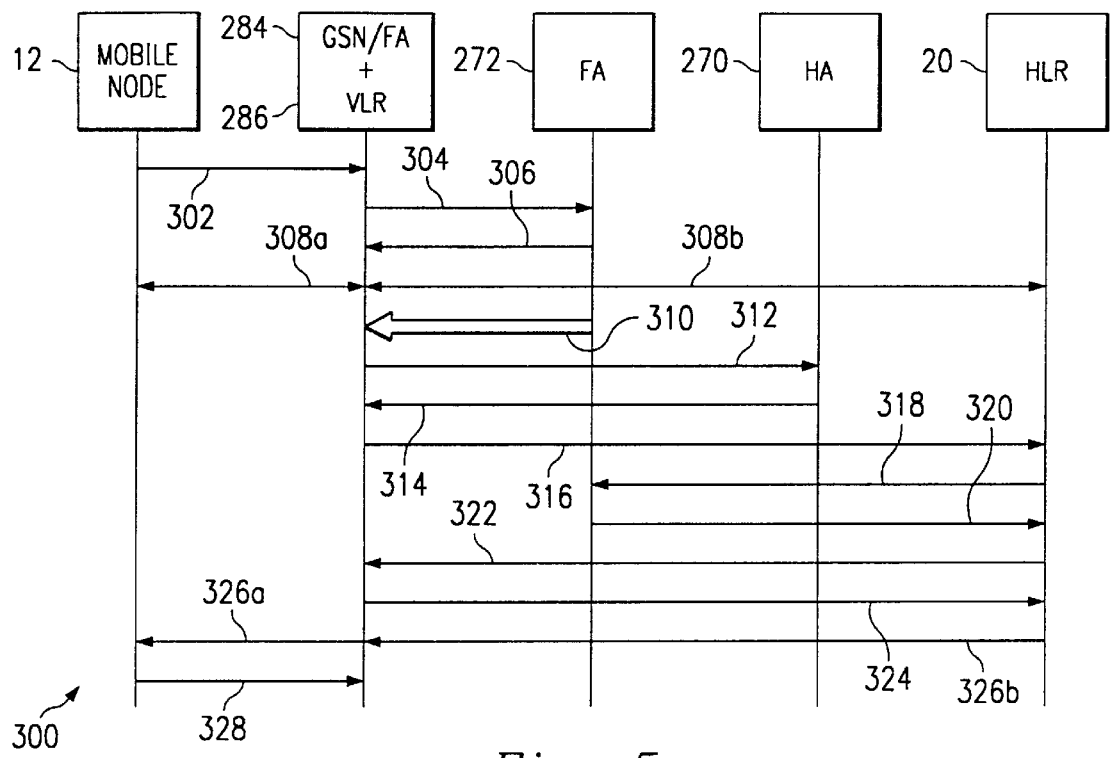

Referring also to FIG. 5a, a call flow diagram 300 illustrates the first example described above. At step 302, the mobile node 12, which is at the location F, sends a GPRS Routing Area Update Request message to the GSN/FA 284 through the base station 16c. The GSN/FA 284 is connected to, or associated with, the VLR 286, which is further connectable to the HLR 20. At step 304, the GSN/FA 284 sends a modified Binding Update Request message to the foreign agent 272. In the present example, the foreign agent 272 served the immediately preceding routing area of the mobile node 12. At step 306, in response to receiving the modified Binding Update Request message, the foreign agent 272 sends a modified Binding Acknowledgment message. As discussed above, this message may be extended to include the context for the mobile node 12. The foreign agent 272 may also ignore certain aspects if it does not have the requested context information. Also, the foreign agent 272 can provide an indicator that the mobile node 12 is mobile IP home based, and therefore does not have a PDP context. However, it is desired that the foreign agent 272 (and home agent 270) have a context, thus enhancing the ability for the mobile node 12 to roam within the different networks because the networks have more information about the current data transfer context.

At steps 308a and 308b, security functions are transmitted between the mobile node 12, the GSN/FA 284, and the HLR 20. At step 310, the foreign agent 272 begins to forward packets to the GSN/FA 284. These packets are those that have been sent to the foreign agent 272 and would have otherwise been sent to the location D. At steps 312, 314, the GSN/FA 284 registers the new location (location F) of the mobile node 12 with the HA 270 using conventional mobile IP messages. At steps 316–324 and 326b, the GSN/FA 284 updates the location of the mobile node 12 with the HLR 20 using conventional MAP messages. At steps 326a and 328, a Routing Area Update operation is completed between the GSN/FA 284 and the mobile node 12.

Figure 5B:
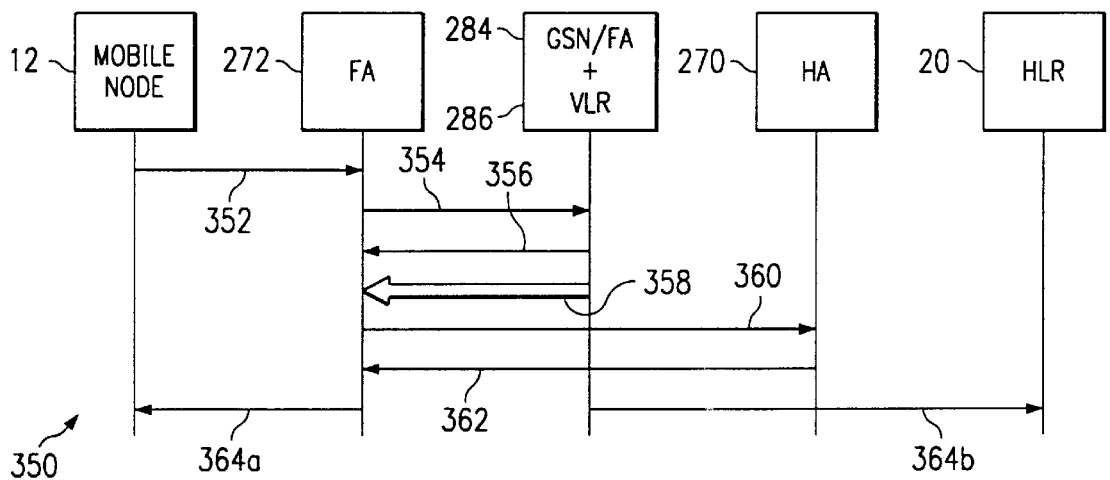

Referring now to FIG. 5b, a second call flow diagram 350 illustrates the second example described above. The second example is a continuation of the first example, except that the mobile node 12 is now returning back to the location D. At step 352, the mobile node 12 sends a mobile IP Registration Request message to the foreign agent 272 through the appropriate radio access network. At step 354, the foreign agent 272 sends a modified Binding Update Request message to the GSN/FA 284. The modified Binding Update Request message should contain an indicator that the mobile node 12 is now back in the mobile IP network 14. In some embodiments, this indicator can be used by the foreign agent 272 to determine that no PDP context is required for the Binding Acknowledgment message (step 356). The indicator can also indicate to the GSN/FA 284 and VLR 286 that the foreign agent 272 can not update the HLR. Thus, the GSN/FA 284 and VLR 286 should update the HLR 20.

At step 356, in response to receiving the modified Binding Update Request message, the GSN/FA 284 sends a modified Binding Acknowledgment message. This message may be extended to include the context for the mobile node 12, as discussed above with reference to step 306.

At step 358, the GSN/FA 284 begins to forward packets to the foreign agent 272. These packets are those that have been sent to the GSN/FA 284 and would have otherwise been sent to the location F. At steps 360, 362, the foreign agent 272 registers the new location (location D) of the mobile node 12 with the HA 270 using conventional mobile IP messages. At step 364a, a mobile IP Registration Reply is sent to the mobile node 12 and the registration is complete. At step 364b, the GSN/FA 284 and VLR 286 send a MAP+ Update Location message, which indicates that the mobile node 12 is once again mobile IP-based to the HLR 20. Upon receipt of the MAP+ Update Location message, the HLR 20 only needs to update the entry for the mobile node 12 and does not need to perform any additional messaging.

Therefore, by adding the context and adding the indicator to the binding update messages, a smooth handover occurs when a mobile node roams between two different networks. This also provides a consistent network interface, independent of the access (e.g., GPRS or mobile IP).

Network Interworking Registration

It is also desired to provide an improved registration method for updating a mobile node's location independent of the access and/or network type. In conventional networks, a significant amount of data is lost when a mobile node transitions to a new serving area. Specifically, in conventional GPRS networks, the mobile node sends an update message and the HLR is updated with the information. In mobile IP, the HLR is not updated. Instead, the mobile node registers with the foreign agent and the prior agent utilizes the care-of address.

In contrast, when a mobile node is about to enter a new serving area, but is still in the old serving area, a message is sent to the old serving GSN. This message indicates that the old serving GSN is to hold any packets destined for that mobile node until it is notified that the mobile node is in the new serving area. Specifically, the new serving GSN sends a GPRS Handover Request message to the old serving GSN. This notification may be in the form of the Binding Update message described above, or for a standard GPRS network, a GTP SGSN Context Request message.

This improved method uses an extension to mobile IP registration messaging instead of the GPRS defined GTP Update PDP Request/Response messages for routing area updates. This message is sent from the new serving GSN/HA to update the home network as to the mobile node's new serving area. This results in any packets destined to this mobile node (being sent via the GSN/HA) to be sent to the new serving GSN/FA. As a result, the present method provides a mechanism for updating a mobile node's location independent of access or home network type, thus providing seamless roaming for GPRS and mobile IP users.

Referring again to FIG. 4, two examples of operation will illustrate the above described method. In the first example, the mobile node will power-up at the location D in the mobile IP network 14. In the second example, the mobile node 12 has powered-up at the location F in the GPRS network 252 and is roaming to the location D in the mobile IP network 14. In both examples, the GPRS network 250 is the home network for the mobile node 12.

In the present two examples, GTP registration techniques (such as updating the PDP context) will not be used. Instead, modified mobile IP Registration Request/Response messages are used. The mobile IP Registration Request message is modified by adding a proxy indicator. For example, the proxy indicator may be a bit that indicates that the network must proxy for the HLR by the GSN/HA. Proxying is necessary because the mobile IP network cannot talk directly to the HLR, so messages must first be routed through the GSNs to get the database updated.

Figure 6A:
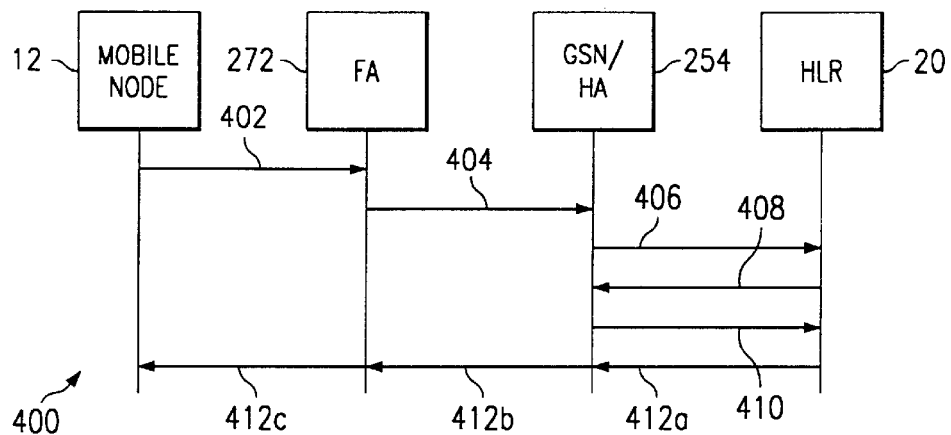

Referring also to FIG. 6a, a call flow diagram 400 illustrates the first example described above. At step 402, the mobile node 12, which is at the location D and is powering-up, sends a mobile IP Registration Request message to the foreign agent 272. Since this is initial registration, the mobile node 12 does not indicate to do a binding update request for registration. At step 404, upon receipt of this message, the foreign agent 272 sends a mobile IP+ Registration Request message to the GSN/HA 254. The GSN/HA 254 is acting as a proxy because there is no MAP interface between the foreign agent 272 and the HLR 20. The mobile IP+ Registration Request message includes an indicator to proxy the MAP location update. In alternative embodiments, GPRS roaming can be changed to always do the MAP location update. Also, although not shown, security features may also be implemented at this time.

At step 406, the GSN/HA 254 sends a MAP Update Location message to the HLR 20. At steps 408 and 410, the GSN/HA 254 and HLR 20 update subscriber data and at step 412a, the HLR 20 sends a MAP Update Location Acknowledge message back to the GSN/HA 254, still acting as a proxy. At step 412b, the GSN/HA 254 sends a mobile IP+ Registration Reply message to the foreign agent 272 and at step 412c, the foreign agent 272 sends a mobile IP Registration Reply message back to the mobile node 12. In this example, the mobile IP Registration Reply message is not sent until after the HLR 20 has been updated and subscriber data has been obtained from the HLR. This works well because the mobile IP Registration Reply message is still sent within a GPRS-required time frame.

Figure 6B:
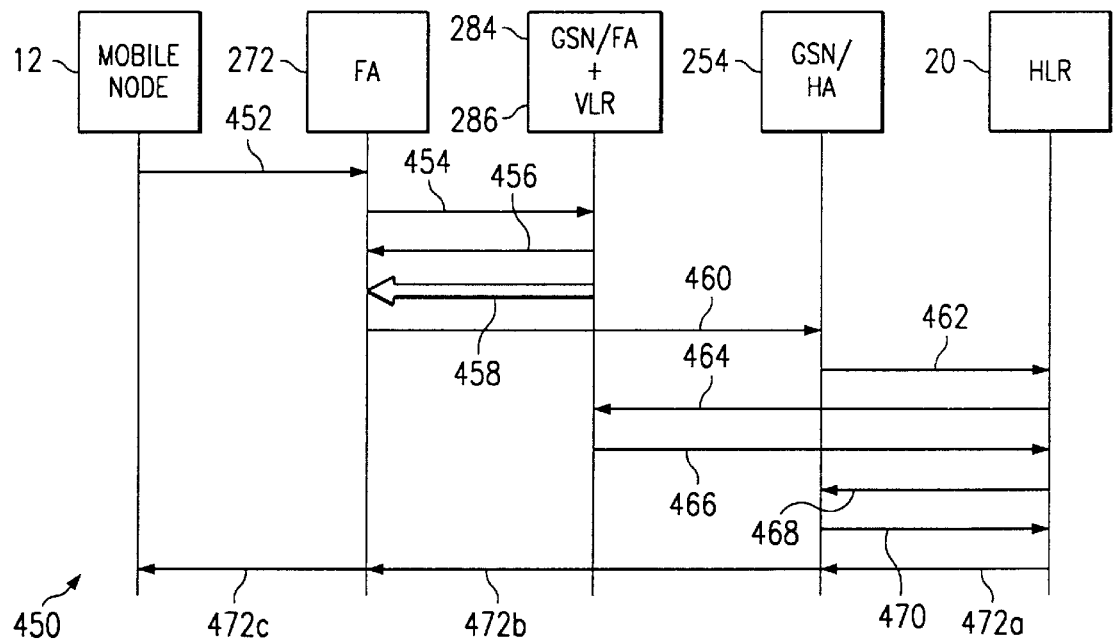

Referring now to FIG. 6b, a second call flow diagram 450 illustrates the second example described above. This example has the active context and uses the binding update. As a result, it uses the mobile IP in the GPRS network and still maintains the HLR database update. Also it uses the mobile IP+ Registration Request message described above.

At step 452, the mobile node 12, which has just roamed to the location D from the location F, sends a mobile IP Registration Request message to the foreign agent 272. Since this is not initial registration, the mobile node 12 indicates to do a binding update request to have packets forwarded appropriately. At step 454, the foreign agent 272 sends a mobile IP Binding Update message to the old GSN/FA 284. A determination must be made as to whether or not the foreign agent 272 can receive the PDP context, as described above. As stated at the beginning, some features of the present disclosure can be used without other features. At step 456, the GSN/FA 284 responds with a mobile IP Binding Acknowledge message and at step 458, begins to forward packets to the foreign agent 272. At step 460, the foreign agent 272 sends a modified mobile IP+ Registration Request message to the GSN/HA 254, similar to step 404 described above in the prior example.

At step 462, the GSN/HA 254 then, acting as a proxy, sends a MAP Update Location message to the HLR 20. At steps 464–470, the GSN/HA 254 and HLR 20 update location and subscriber data and at step 472a, the HLR 20 sends a MAP Update Location Acknowledge message back to the GSN/HA 254, still acting as a proxy. At step 472b, the GSN/HA 254 sends a mobile IP+ Registration Reply message to the foreign agent 272 and at step 472c, the foreign agent 272 sends a mobile IP Registration Reply message back to the mobile node 12. As in the prior example, the mobile IP Registration Reply message is not sent until after the HLR 20 has been updated and subscriber data has been obtained from the HLR.

In summary, the conventional GTP Update PDP Context Request message is replaced with a modified Registration Request message, similar to that used in mobile IP. Also, the conventional GTP Update PDP Context Response message is replaced with a modified Registration Response message, similar to that used in mobile IP. A bit, or option, is added to the mobile IP Registration Request message to indicate when proxying for the HLR is required at the GSN/HA. Therefore, by indicating that a proxy to the MAP interface is needed during mobile registration, benefits normally associated with GPRS networks can be easily achieved.

Optimized Handover

It is also desired to provide an improved registration method for closing the window on data loss when a mobile node performs a handover to a new routing area. In conventional packet data networks such as mobile IP and GPRS, a previously visited network is informed of a handoff (e.g., with a Binding Update message) to a new routing area after the handoff has occurred. At that time, the previous routing area begins to forward packets to the new routing area. There is still a window when the old GSN is sending the packets to the mobile node, but the mobile node is gone.

Specifically, in GPRS networks, the new serving GSN request the old serving GSN to forward the context and any subsequent packets to the new GSN. As a result, the PDP context is updated so that the old gateway GSN tunnels the packets to the new serving GSN. Likewise, in mobile IP networks, a foreign agent obtains a care-of address and registers it with the home agent of the mobile node. As a result, any subsequent data packets for the mobile node will be routed to the new foreign agent for a specific time interval.

In contrast, the present method provides a new message to the GPRS access interface. When a mobile node is about to enter a new serving area, but is still in the old serving area, a GPRS Handover Request message is sent to the old serving GSN. This message indicates that the old serving GSN is to hold any packets destined for that mobile node until it is notified that the mobile node is in the new serving area. This happens during hand-off, before the new link is actually established. Some of the packets may have already been sent to the radio access network, and should be successfully delivered to the mobile node. However, any new packets that would otherwise be on their way to the mobile node, are stored. After the GPRS Handover Request message is sent to the old GSN, the mobile node sends the Routing Area Request message to the new GSN.

Referring again to FIG. 4, an example of operation will illustrate the above described method. In this example, the mobile node has roamed from a location G in GPRS network 250 to the location F in the GPRS network 252. In furtherance of the example, the GPRS network 250 is the home network for the mobile node 12.

Figure 7:
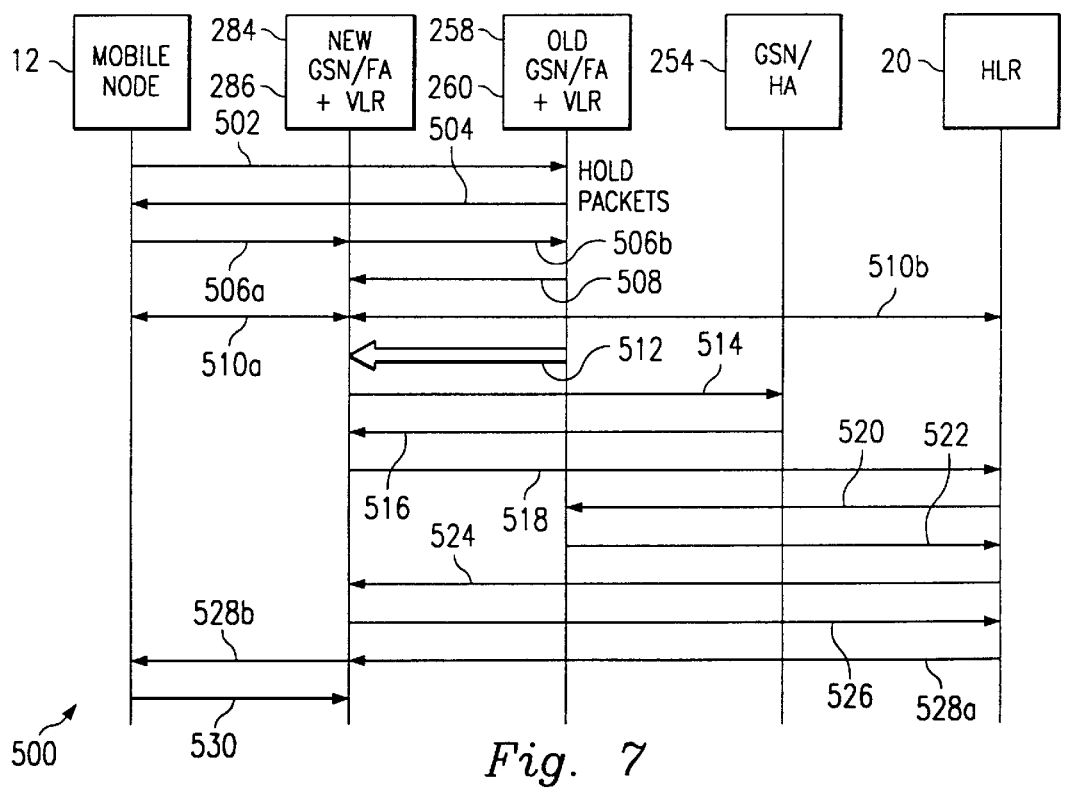
FIGS. 5a–7 are call flow diagrams illustrating discrete examples of the present invention using the networks of FIG. 4.

Referring also to FIG. 7, a call flow diagram 500 illustrates the example described above. At step 502, the mobile node 12, which is still at the location D, sends a GPRS Handover Request message to the GSN/FA 258. At this stage of the example, the GSN/FA 258 is still the serving GSN, but the mobile node 12 is beginning to initiate a handoff to the GPRS network 252. Upon receipt of the GPRS Handover Request message, the GSN/FA 258 starts to hold all packets for the mobile node 12. It is understood that some packets may already be on their way to base station 16b. These packets should still be delivered to the mobile node at the location G. At step 504, the GSN/FA 258 sends a GPRS Handover Response message back to the mobile node 12.

At step 506a, upon receipt of the GPRS Handover Response message (or after a timeout), the mobile node 12 sends a GPRS Routing Area Update message to the GSN/FA 284. The mobile node 12 is now at the location F and seeks to establish a link with the GSN/FA 284. At step 506b, the GSN/FA 284 sends a mobile IP+ Binding Update message to the GSN/FA 258 (now the old GSN). At step 508, the old GSN/FA 258 responds with a mobile IP+ Binding Acknowledge message. At steps 510a and 510b, general MAP security functions are performed between the mobile node 12, the new GSN/FA 284, and the HLR 20. At step 512, now that the old GSN/FA 258 has been notified that the mobile node 12 has been authenticated at the new GSN/FA 284, it begins to forward packets to the new GSN/FA. The old GSN/FA 258 will continue to forward any packets received until it receives a MAP Cancel Location message or a timeout occurs.

At step 514, the new GSN/FA 284 sends a modified mobile IP+ Registration Request message to the GSN/HA 254 to update its registration location information. At step 516, the GSN/HA 254 sends a MAP+ Registration Reply message back to the GSN/FA 284.

At step 518, the GSN/FA 284 sends a MAP Update Location message to the HLR 20. No proxy is required because the GSN/FA 284 includes a MAP interface. At steps 520–526, the GSN/FA 254, GSN/FA 258, and the HLR 20 update location and subscriber data. At step 528a, the HLR 20 sends a MAP Update Location Acknowledge message back to the GSN/FA 284. At step 528b, the GSN/FA 284 sends a GPRS Routing Area Update Accept message to the mobile node 12 and at step 530, the mobile node 12 sends a GPRS Routing Area Update Complete message back to the GSN/FA 284.

In summary, a new message is created to notify the serving GSN when a mobile node is about to leave the routing area. This closes the window on data loss by allowing the old serving GSN to hold any packets destined for the mobile node until the mobile node has entered the new serving area.

A benefit of the above described embodiments is that they facilitate roaming between the mobile IP network and the GPRS network.

Another benefit of the above described embodiments is that they merge mobile IP network elements into the GPRS network, making optimal use of network and radio frequency interfaces.

Yet another benefit of the above described embodiments is that they provide a baseline for evolution to an access independent, IP centric, mobility enabled network.

Yet another benefit of the above described embodiments is that it enables mobile IP, which is more efficient than GPRS as far as bandwidth, but keeps GPRS in the access areas.

Yet another benefit of the above described embodiments is that it applies to other wireless networks, such as TDMA.

Yet another benefit of the above described embodiments is that it uses internet standard protocols, which are well known and well supported.

Although illustrative embodiments of the invention have been shown and described, other modifications, changes, and substitutions are intended in the foregoing disclosure. Also, the modules of the serving nodes (e.g., the GSN/FA and the GSN/HA) may be distributed across different platforms and may use different types of messages that achieve the same overall function as the modules and messages discussed above. For example, if the serving nodes are in a TDMA network, they will still perform the same function with different messages. Accordingly, it is appropriate that the appended claims be construed broadly and in a manner consistent with the scope of the disclosure.

What is claimed is:

1. A packet data network comprising:
    a first base station for providing wireless access to a mobile node;
    a support node connected to the base station;
    a memory accessible to the support node; and
    a security gateway;
    wherein the support node is capable of creating an internet protocol (IP) tunnel connecting it to a mobile IP network capable of handling mobile IP specific messaging and also converts the wireless access messaging to mobile IP specific messaging; and wherein the memory is operable to hold data that is transferable through the IP tunnel for a predetermined period of time.

2. The network of claim 1 further comprising:
    a second base station for providing wireless access to the mobile node;
    wherein the support node handles the mobility of the mobile node from the first base station to the second base station.

3. The network of claim 1 further comprising:
    a register connected without mobile IP specific messaging;
    wherein the support node is also capable of communicating with the register.

4. The network of claim 1 wherein, if the mobile node roams to the mobile IP network, the support node is also capable of handing off its connection to an agent of the mobile IP network.

5. The network of claim 1 wherein the support node is a GPRS support node and includes mobile IP agent functionality.

6. The network of claim 5 wherein the GPRS support node acts as a home agent for the mobile node and is capable of establishing a care-of address for the mobile node if the mobile node roams into the mobile IP network.

7. The network of claim 5 wherein the GPRS support node provides a home address for the mobile node.

8. The network of claim 5 wherein the GPRS support node sends packets to and from the mobile node using conventional IP routing mechanisms.

9. A method for use in a wireless communications network capable of supplying packet data transfers, the method comprising:
    establishing a first connection with a mobile node;
    establishing a second connection between the first connection and an internet protocol (IP) network via an IP tunnel;
    providing an address for the mobile node;
    converting a protocol compatible with the mobile node connection to a protocol compatible with the IP network connection;
    converting the IP compatible protocol to the mobile node compatible protocol;
    holding data that is transferable through the IP tunnel for a predetermined period of time;
    maintaining a location of the mobile node;
    updating a home location register of the location; and
    if the mobile node leaves a first routing area, ending the connection with the mobile node.

10. The method of claim 9 further comprising:
    if the mobile node leaves a first routing area, establishing a care-of address for the mobile node.

11. The method of claim 9 wherein the first routing area is part of a home network for the mobile node, the method further comprising:
    providing a home address for the mobile node.

12. The method of claim 9 wherein the first routing area is not part of a home network for the mobile node, the method further comprising:
    maintaining a visitor list with an internet protocol address for the mobile node.

13. The method of claim 9 wherein converting the protocol between the mobile node and IP network includes modifying a header for packet data transfers.

14. The method of claim 9 wherein each of the protocols is a predetermined protocol for data transfer.

15. A method for updating a register in a cellular telephone network of activities by a mobile node in a mobile internet protocol network, the method comprising:
    receiving a first mobile internet protocol registration request by an agent of the mobile internet protocol network serving the mobile node;
    sending a second mobile internet protocol registration request to a serving node in the cellular telephone network, requesting that the serving node serve as a proxy;
    sending a location message to the register from the proxy;
    after the location message has been received by the register, sending a first registration reply to the serving node; and
    after the first registration reply has been received by the serving node, sending a second registration reply to the agent.

16. The method of claim 15 wherein the serving node is a GPRS serving node and the register is a home location register.

17. The method of claim 16 wherein the second mobile internet protocol registration uses a mobile application protocol interface to the home location register.

18. A GPRS service node in a cellular telephone network capable of facilitating a mobile node in a mobile internet protocol network, the GPRS service node comprising:
    means for receiving an update request by an agent of the mobile internet protocol network serving the mobile node;
    means for recognizing that the update request also requests that the GPRS serving node act as a proxy, wherein the request for the proxy is denoted by an indicator in the update request; and
    means for forwarding the update message to a register associated with the cellular telephone network.

19. The GPRS service node of claim 18 further comprising:
   means for receiving an acknowledgment from the register indicating receipt of the update message;
   means for forwarding the acknowledgment to the agent.

20. The GPRS service node of claim 18 wherein the register is a home location register.

21. The GPRS service node of claim 18 wherein means for forwarding the update message to a register uses a mobile application protocol interface to the home location register and the means for forwarding the acknowledgment to the agent uses an internet protocol.

* * * * *